(12) United States Patent
Kim et al.

(10) Patent No.: US 7,890,446 B2
(45) Date of Patent: Feb. 15, 2011

(54) SOFTWARE ROBOT APPARATUS

(75) Inventors: Joon Koo Kim, Seoul (KR);
Kwang-Choon Kim, Suwon-si (KR);
Byung-Kwon Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 684 days.

(21) Appl. No.: 11/852,047

(22) Filed: Sep. 7, 2007

(65) Prior Publication Data

US 2008/0066065 A1  Mar. 13, 2008

(30) Foreign Application Priority Data

Sep. 7, 2006  (KR) .................... 10-2006-0086439

(51) Int. Cl.
*G06N 5/00* (2006.01)
(52) U.S. Cl. .................... 706/47; 706/45
(58) Field of Classification Search ............. 706/47, 706/45
See application file for complete search history.

(56) References Cited

U.S. PATENT DOCUMENTS

2004/0078322 A1  4/2004  Sumi et al.

FOREIGN PATENT DOCUMENTS

| KR | 1020020026165 | 4/2002 |
|---|---|---|
| KR | 1020040078322 | 9/2004 |
| KR | 1020040098498 | 11/2004 |
| KR | 1020050056824 | 6/2005 |
| KR | 1020060059159 | 6/2006 |

OTHER PUBLICATIONS

Mitola, An Integrated Agent Architecture for Software Defined Radio, Dissertation for Doctor of Technology, Royal Institute of Technology (KTH), Stockholm, Sweden, 2000, pp. 1-304.*

* cited by examiner

*Primary Examiner*—Wilbert L Starks, Jr.
(74) *Attorney, Agent, or Firm*—The Farrell Law Firm, P.C.

(57) ABSTRACT

A software robot apparatus (sobot apparatus) with a genetic code is disclosed. The sobot apparatus includes an application module, an artificial animated object engine, a sobot protocol module, an update agent, an update protocol module, a network interface, a sobot player, a script engine, a player database, a repository interface, a sobot graphic/audio interface, a 3D engine, a system software, a memory device, a display part, and an audio output part.

21 Claims, 9 Drawing Sheets

SOFTWARE ROBOT APPARATUS

PRIORITY

This application claims priority under 35 U.S.C. §119(a) to a Korean Patent Application entitled "Software Robot Apparatus" filed in the Korean Intellectual Property Office on Sep. 7, 2006 and assigned Serial No. 2006-86439, the contents of which are incorporated herein by reference.

BACKGROUND OF THE INVENTION

1. Field of the Invention

The present invention relates to a software robot with genetic code, and in particular, to a software robot apparatus having a compatible software robot platform.

2. Description of the Related Art

The genetic code found in a software robot (sobot) is the robot genome consisting of a plurality of artificial chromosomes, which enables the software robot to have individuality showing unique response and behavior upon receiving an input of an external stimulus. For example, a puppy sobot may react to an input of feeding-like stimulus by showing an action of swinging its tail or lightly barking. The sobot is also provided with various functions such as learning, memorizing and instinctive behavior, which affect the sobot's reactions and behavior. In particular, the artificial chromosomes defined in the robot genome interact with the external environment that define the robot's individuality or personality that changes the robot's internal state (i.e., motivation, homeostasis, emotion, etc.) and behavior. In this case, the characteristics of motivation, homeostasis, emotion, behavior, etc. are as shown below in Table 1:

chromosomes which are the parameters affecting the robot's internal state according to the input of the external stimuli.

This also applies to the behavior selection-related chromosomes, except that behavior selection-related chromosomes involve various behaviors instead of the external stimuli and also involve various parameters for the particular behavior relating to their respective internal states. The essential element-related chromosomes group, which are the essential parameters greatly affecting a change of the internal state and the external behavior, may include the volatility, initial value, mean value, convergent value, damping value with time, and a particular value determined at a particular time in accordance with the respective internal states such as motivation, homeostasis and emotion. As a result, the robot genome consists of the essential element-related chromosomes serving as the essential parameters affecting a change of the internal state and the external behavior, the internal state-related chromosomes serves as the parameters affecting the robot's internal state according to the input of the external stimuli, and the behavior selection-related chromosomes serves as the parameters determining an external behavior corresponding to the internal state presently determined.

All of the parameters of the essential element-related chromosomes group, the internal state-related chromosomes group, and behavior selection-related chromosomes group, as well as the changes of the internal state such as changes of emotion, motivation and homeostasis depending on the external stimuli and the behaviors corresponding to such changes may be determined by an artificial animated object engine. The process relating to the artificial animated object engine is generally known in the art in Korean Laid-Open Patent Publication No. 2004-78322 entitled "Artificial Animated Object

TABLE 1

| | |
|---|---|
| Personality | Determiner of the totality or a part of behavioral characteristics rather than simply summarized technical details. Including motivation, homeostasis, and emotion. Namely, the personality engine represents an engine involving all of the motivation, homeostasis, and emotion. Generating various internal states and behaviors. |
| Motivation | Process of rousing an activity of a living being and controlling its pattern. Cause of selecting and performing an activity. Examples include curiosity, intimacy, weariness, avoidance, possession, dominance, etc. |
| Homeostasis | Function of maintaining a stable state of equilibrium between the different but interdependent elements of an organism regardless of continuous changes of the internal and external environments. Cause of selecting and performing an activity. Examples include hunger, sleepiness, tiredness, etc. |
| Emotion | Psychic and physical reaction subjectively experienced as strong feeling. Examples are happiness, sadness, anger, fear, etc. |
| Behavior | Anything that an organism does involving action such as moving and stopping. Examples are sleeping, eating, running, etc. The behavioral types to be selected by an organism are limited, and it may do only a single behavior at any instant. |

Furthermore, the artificial chromosomes may be classified into three groups: (1) an essential element-related group, (2) an internal state-related group, and (3) a behavior selection-related group. The essential element-related group chromosomes define the essential parameters greatly affecting a change of the internal state and the external behavior, while the internal state-related group chromosomes define the parameters affecting the robot's internal state according to the input of the external stimuli exerted to the robot. The behavior selection-related chromosomes, however, define the parameters that determine an external behavior corresponding to the internal state presently determined. In this case, the internal state is defined as motivation, homeostasis, emotion, etc. Namely, the internal state of the robot may be determined by the robot's own internal state and the internal state-related System and an Educational Software System Using It" invented by Jong-Whan KIM and published on Sep. 10, 2004.

However, though current sobot technology has significantly developed the state of the sobot's artificial animated object engine, the technology still lacks in standardization of the other components necessary to develop useful sobot applications. Hence, the components required for developing the sobot applications have been developed separately and according to each developer. Furthermore, since the artificial animated object engine is not hardware-independent, a different porting system is required for each instrument equipped with the artificial animated object engine. Accordingly, whenever a sobot is developed or applied to a particular instrument, a different platform is developed, thereby preventing compatibility between the different sobot applications and, thus, hampering future sobot applications development.

SUMMARY OF THE INVENTION

An aspect of the present invention is to substantially solve at least the above problems and/or disadvantages and to provide at least the advantages described below. Accordingly, one aspect of the present invention is to provide a sobot apparatus with a standardized platform covering all the components required for developing the sobot applications.

It is another aspect of the present invention to provide a sobot apparatus with a separate platform for varieties of instruments such as mobile phones, WIBRO phones, PDAs and PCs.

It is still another aspect of the present invention to provide a convenient environment for sobot developers to develop sobot applications using only the interface provided in the platform of a sobot apparatus.

According to one aspect of the present invention, there is provided a sobot apparatus with genetic code. The sobot includes an artificial animated object engine including a perception module, a learning module, an internal state module, a behavior selection module and a motor module for changing the internal state involving the motivation, homeostasis, and emotion of the sobot in response to the input of an external stimulus exerted to the sobot according to the genetic code so as to determine the behavior of the sobot; a sobot protocol module for providing a communication protocol for sobot-related data communication between the sobot and another external device; an update agent for controlling the update of the sobot-related data; an update protocol module for providing an update protocol for transmitting/receiving the update data under the control of the update agent; a network interface for interfacing the sobot with another device through a network in cooperation with the sobot protocol and update protocol; a player database for storing a plurality of action script files respectively describing a plurality of behaviors conducted by the sobot; a script engine both for encoding a plurality of action files respectively describing the plurality of behaviors to generate the respective action script files stored in the player database and for parsing the script files retrieved from the player database; a memory device for storing sobot data including a genetic code, a basic model information, an internal state information, an action information, and a resource information of at least one sobot; a repository interface for interfacing the memory device with the player database; an output application module for visual output of the sobot by means of images and sounds; a sobot graphic/audio interface for interfacing the output application module with a display device; an application module for transferring an external input relating to the output and control of the sobot to a sobot player, an external input affecting the internal state of the sobot both to the artificial animated object engine and to the sobot player, an external input relating to the communication of the sobot to the sobot protocol module, and a behavior determined by the artificial animated object engine to the sobot player; and the sobot player for output of the sobot in cooperation with the script engine and output application module through the repository interface and sobot graphic/audio interface according to an input of the application module.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
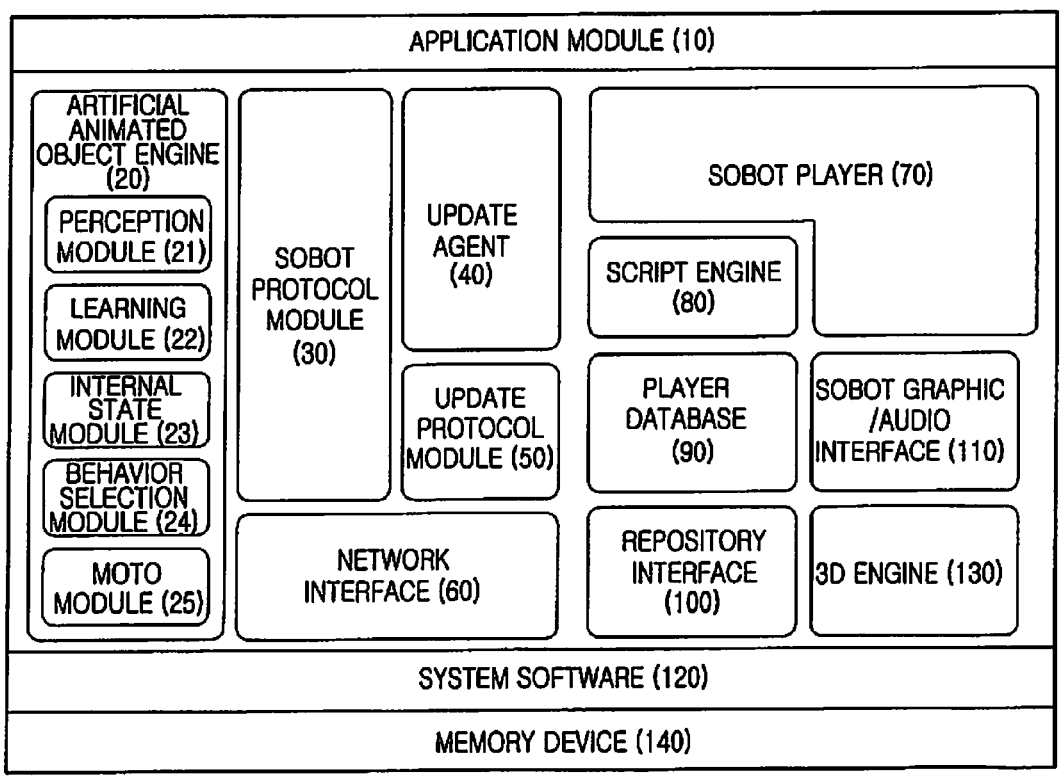
FIG. 1 is a block diagram for illustrating the platform structure of a sobot apparatus according to the present invention.

In FIG. 1, the platform structure of a sobot apparatus with genetic code is shown according to an embodiment of the present invention. The sobot apparatus is adapted to generate a sobot in a sensible form, which may include a plurality of sobots. The sobot apparatus includes an application module 10, an artificial animated object engine 20, a sobot protocol module 30, an update agent 40, an update protocol module 50, a network interface 60, a sobot player 70, a script engine 80, a player database 90, a repository interface 100, a sobot graphic/audio interface 110, a 3D engine 130, system software 120, a memory device 140, a display part (not shown), and an audio output part (not shown). The application module 10 is the uppermost layer and provides an external input interface, including such devices, for example, as a sobot authorizing device, a pressure sensor, and an optical sensor.

The memory device 140 stores the sobot data corresponding to at least one sobot. The sobot data includes basic model information, internal state information, action information, resource information, and genetic code of the sobot. The genetic code is a robot genome consisting of a plurality of artificial chromosomes, which may be classified into the essential element-related group, internal state-related group, and behavior selection-related group. The essential element-related group chromosomes define the essential parameters greatly affecting a change of the internal state and the external behavior of the robot, and the internal state-related group chromosomes define the parameters affecting the robot's internal state according to the input of the external stimuli exerted to the robot. Also, the behavior selection-related group chromosomes define the parameters of the robot that determine an external behavior corresponding to the internal state presently determined.

In one embodiment, the genetic code is uniquely determined for the corresponding sobot, and is unchangeable. The basic model information represents the type and model of the sobot and also provides the sobot with a particular genetic code, e.g., a certain characteristic, such as the characteristics relating to a puppy, a cat, or even a robot. The internal state information represents the character traits of the sobot relating to motivation, homeostasis, and emotion and is changed by the artificial animated object engine 20 according to the corresponding genetic code and the input of the external stimuli exerted by the user or detected by the sensor when the sobot has been activated so as to be perceived by the user. The action information represents the action taken by the sobot as determined by the artificial animated object engine 20 according to the internal state information. The resource information represents the various sub-items set corresponding to a particular sobot, e.g., such accessories and scenes as the sobot character may take.

The artificial animated object engine 20 further includes a perception module 21 for perceiving the external environment, an internal state module 23 for representing the internal state of the sobot such as an emotion state of the artificial animated object, a behavior selection module 24 for selecting a behavior of the artificial animated object according to the external information and the internal state, a learning module 22 for acclimating the artificial animated object to the external environment, and a motor module 25 for actually realizing the behavior of the artificial animated object, thereby changing the internal state involving the motivation, homeostasis and emotion of the sobot in response to the input of an external stimulus exerted to the sobot so as to determine a behavior of the sobot such as action and facial expression.

The artificial animated object engine 20 may also stores, manages, and controls the individual and emotional information of the sobot by means of the genetic code. Hence, the artificial animated object engine 20 enables the user to create the individuality and emotion of the sobots with different genetic codes. In addition, the artificial animated object engine 20 determines an action to be externally shown according to the data collected through the learning, memorizing, and instinctual functions.

Below, each module is described in greater detail. The perception module 21 pre-processes the information concerning the internal state change and behavior selection of the sobot and the sensor information used for learning. The perception module 21 also delivers the presently input information selectively according in a predetermined priority order to the behavior selection module 24 to select a behavior. Preferably, the perception module 21 includes a plurality of sensors, a symbolizer, and an attention selector. In operation, the internal state module 23 changes the internal state of the sobot according to the input perceived through the perception module 21. The internal state module 23 changes the internal state delivered to the behavior selection module 24 by considering the external input and the genetic code of the corresponding sobot. The internal state represents the sobot's internal characteristic traits, such as motivation, homeostasis, and emotion. The motivational trait enables the sobot to initiate an action, the homeostasis trait enables the sobot desire to maintain, and the emotion trait defines the emotional state of the sobot. Examples of motivational trait are curiosity, intimacy, monotony, avoidance, and greed. Examples of the homeostasis traits are fatigue, hunger, and drowsiness. Examples of emotional traits are happiness, sadness, anger, fear, and quietude.

Preferably, the scope of the internal state of the sobot may be extended or shortened to include many other varieties. The behavior selection module 24 includes a general behavior selector and an inherent behavior selector so as to select one of the actions previously stored considering the probability based on the inputs received from the perception module 21 and internal state module 23. The behavior selection module 24 may select as the final action the action determined by the inherent behavior selector. The learning module 22 may include a preference learner for enabling the sobot to avoid or approach the objective intended by the user's input according as the user's input represents praise or reproach, and a voice learner for making the sobot perform the action requested by a voice command of the user. The motor module 25 provides the sobot with a method of moving in virtual space according to the behavior selected by the behavior selection module 24. The process by which the artificial animated object engine 20 changes the internal state of the sobot according to the corresponding genetic code and the external input to determine a behavior for the sobot and to make the sobot perform learning has been disclosed in Korean Laid-Open Patent Publication No. 2004-78322 entitled "Artificial Animated Object System and an Educational Software System Using It" invented by Jong-Whan KIM and published on Sep. 10, 2004.

The sobot protocol module 30 provides a protocol to enable the sobot apparatus to communicate with a sobot server for controlling the transfer, information and certification of the sobot and with other devices. All the information concerning the sobot is transmitted through the sobot protocol module 30 to both sobot server and other devices. The sobot server controls the assignment, transfer, information and certification of the sobots and the information of the instrument equipped with each sobot. In addition, the sobot server cooperates with the content providers so as to update the action script file of the sobot and the sobot-related resources such as the kind of the sobot, item and scene.

The update agent 40 controls all the update relating to the sobot as a sub-system for updating the structure files and resources of the platform of the sobot apparatus. Connected to the sobot server, the update agent 40 compares the sobot's update version stored in the sobot apparatus with the update version presently provided by the sobot server so as to find out update data. The update agent 40 updates the structure files and resources of the platform of the sobot apparatus with the update data received from the sobot server.

The update protocol module 50 provides OMA DM (Object Management Architecture Device Management) protocol for performing the actual update under the control of the update agent 40. The network interface 60 interfaces the sobot apparatus with the sobot server or other devices in a network. For example, the network interface 60 provides an interface for serial communication, TCP/IP (Transmission Control Protocol/Internet Protocol) communication, and SMS (Short Message Service)/MMS (Multimedia Message Service) communication.

The sobot graphic/audio interface 110 and 3D engine 130 are the final output application for generating the sobot. The sobot may be generated in a graphic, text or audio form according to the kind of the output application provided in the sobot apparatus. In the present embodiment, the sobot apparatus equipped with the sobot graphic/audio interface 110 and 3D engine 130 generates the sobot as a 3D image. The sobot graphic/audio interface 110 supports the porting for any kind of 3D engine. In another example, if the sobot platform is mounted in a robot, providing a robot with an operational application as the final output application, the sobot may be generated by the robot.

The script engine 80 encodes and decodes the action script file of the sobot under the control of the sobot player 70. In order to enable the sobot to actually perform an action, the action file corresponding to each action of the sobot is stored and managed in a script file format for reduction of its size and easy transmission. The action of the sobot may be a facial expression such as smile, tears, and distortion, or a motion such as walking, running, lying and sitting. The action file for generating such action may include data representing one or more actions and the interrelationship between these actions. The action file may be composed through the sobot server or sobot apparatus, but is finally stored into the sobot apparatus as the script file format. The script engine 80 is controlled by the sobot player 70 so as to parse the action script file previously stored in the player database 90 that enable the sobot to perform the corresponding action, or to encode a generated action file scripted into the corresponding action script file stored in the player database 90.

The player database 90 stores a plurality of action script files as well as the data required for generating the sobot in connection with the output application provided in the sobot apparatus. In this embodiment, it stores the information, text and behavioral information relating to 3D modeling. The repository interface 100 interfaces the sobot player 70 with the player database 90 and memory device 140 so as to deliver the action script and the sobot data retrieved respectively from the player database 90 and the memory device 140 to the sobot player 70.

The sobot player 70 enables both actual generation and action of the sobot by controlling the application module 10, script engine 80, player database 90, repository interface 100, sobot graphic/audio interface 110 and 3D engine 130. Namely, receiving a command for requesting a desired sobot from the application module 10, the sobot player 70 retrieves the corresponding sobot data from the memory device 140 through the repository interface 100. Then, the sobot player 70 obtains from the player database 90, through the repository interface 100, the action script corresponding to the action information of the sobot data, delivered through the sobot graphic/audio interface 110 to the script engine 80. The sobot player 70 also delivers the basic model and resource information of the sobot data to the sobot graphic/audio interface 110, which accordingly cooperates with the 3D engine 130 to visually generate the sobot.

The application module 10 delivers the user's input exerted to the generated sobot to the artificial animated object engine 20. The user's input, for example, may be a value detected by a pressure sensor touched by the user as in stroking the sobot apparatus. Alternatively, this value may be one selected by the user through a menu provided in a text form like "feeding". The artificial animated object engine 20 changes the internal state of the sobot according to the user's input and the genetic code of the sobot retrieved from the memory device 140, and it selects the behavior corresponding to the change of the internal state so as to request the application module 10 to designate the action corresponding to the behavior. The application module 10 delivers the action designated by the artificial animated object engine 20 to the sobot player 70, which in turn obtains the action script corresponding to the designated action through the repository interface 100, delivered to the sobot graphic/audio interface 110. Then, the script engine 80 parses the action script received from the sobot graphic/audio interface 110 so as to enable the sobot graphic/audio interface 110 to cooperate with the 3D engine to generate the image and audio representing the operation of the sobot according to the action script.

If, however, the memory device 140 stores the sobot data of a plurality of sobots, and a request for another sobot is received from the application module 10, the sobot player 70 cooperates with the repository interface 100 and the sobot graphic/audio interface 110 to replace the presently generated sobot with the newly generated one. In this case, if the sobot data of the previously generated sobot is changed, it is stored in the memory device 140. In addition to the function of generating the sobot, the sobot player 70 performs the function of managing the sobot data.

In FIGS. 2 to 11, flowcharts are shown illustrating the process of the sobot apparatus generating the sobot, as well as the platform interface used in each step thereof.

Figure 2:
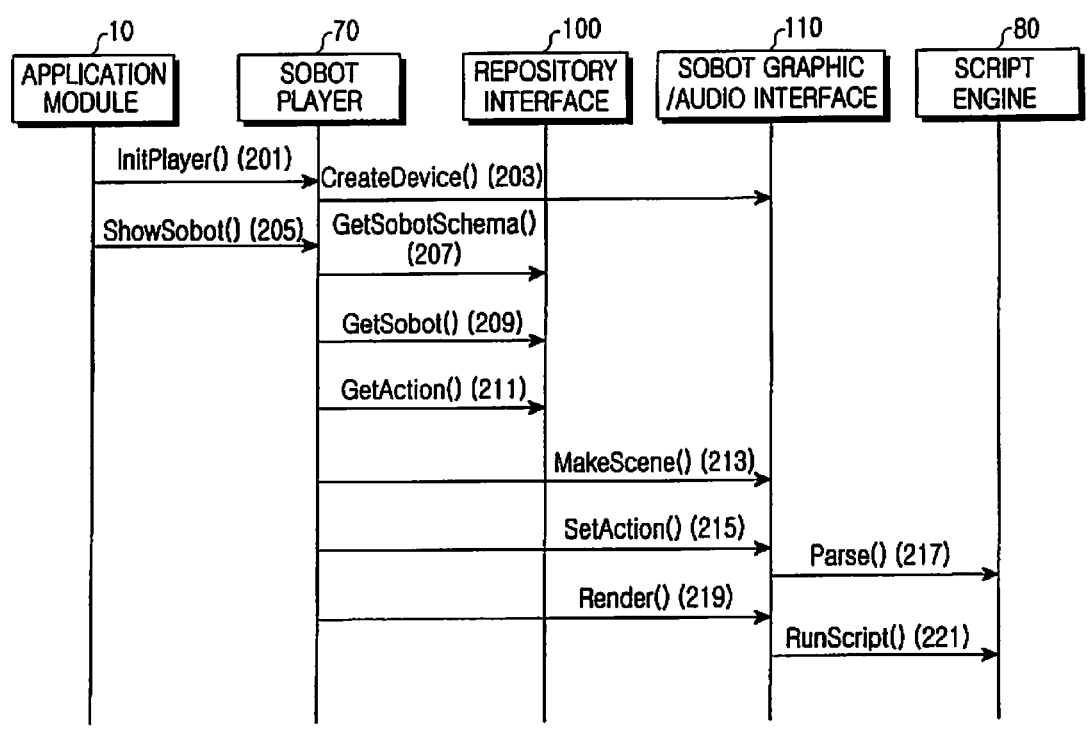
FIG. 2 is a flowchart for illustrating a process of generating a sobot in a sobot apparatus according to the present invention.

FIG. 2 shows the process of the sobot apparatus generating the sobot according to an embodiment of the present invention. Upon receiving a request for generating a sobot, the application module 10 sends in step 201 generated a sobot designation function InitPlayer( ) to the sobot player 70 to designate the sobot as generated. The sobot player 70 sends, in step 203, a creative device function CreateDevice( ) to the sobot graphic/audio interface 110 to determine and initialize the device for generating the sobot. In this embodiment, the generating device is a 3D image. In step 205, the application module 10 sends a sobot generation function ShowSobot( ) to the sobot player 70 to generate the sobot. Then, the sobot player 70 sends, in step 207, a sobot schema obtaining function GetSobotSchema( ) to the repository interface 100 so as to obtain the basic sobot schema for generating the sobot. Then, the sobot player 70 sends, in step 209, a sobot data obtaining function GetSobot( ) to the repository interface 100 to retrieve the sobot data from the memory device 140. The sobot player 70 sends, in step 211, an action obtaining function GetAction( ) to the repository interface 100 to retrieve the action script corresponding to the action information of the sobot data. The repository interface 100 retrieves the corresponding action script defined by the GetAction( ) function from the database 90, delivered to the sobot player 70. The sobot player 70 also sends, in step 213, a scene forming function MakeScene( ) to the sobot graphic/audio interface 110 to set the scene of the generated sobot according to the resource information of the sobot data. In this case, the sobot graphic/audio interface 110 cooperates with the 3D engine 130 so as to form the background scene of the sobot according to the scene information defined by the MakeScene( ) function.

Furthermore, the sobot player 70 sends, in step 215, an action set function SetAction( ) defining the action script obtained in step 211 to the sobot graphic/audio interface 110, which in turn sends, in step 217, a parsing function Parse( ) to the script engine 80 to parse the action script defined by SetAction( ). When the script engine 80 has parsed the action script, the sobot player 70 sends, in step 219, a render function Render( ) to the sobot graphic/audio interface 110 so that the sobot graphic/audio interface 110 cooperates with the 3D engine so as to model the sobot into a 3D image according to the basic model and resource information of the sobot data. Then, the sobot graphic/audio interface 110 sends, in step 221, a script run function RunScript( ) to the script engine 80, which in turn cooperates with the 3D engine 130 to run the a parsed action script to enable the generated sobot to perform the corresponding action.

Figure 3:
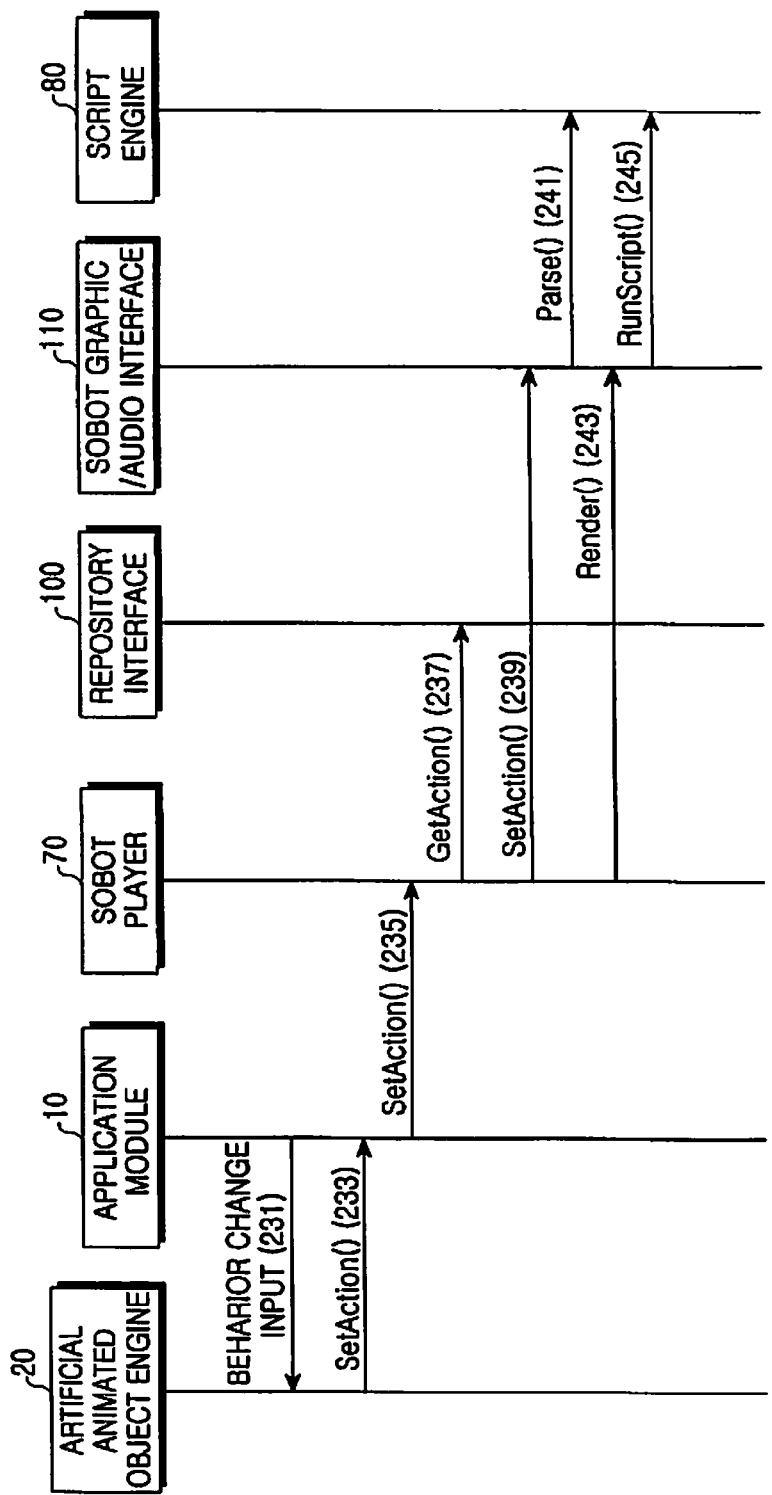
FIG. 3 is a flowchart for illustrating a process of changing the behavior of a sobot in a sobot apparatus according to the present invention.

In FIG. 3, a flowchart of a process of changing the behavior of the generated sobot according to the external input inducing a behavior change is shown. The application module 10 sends, in step 231, a generated behavior change function corresponding to the external input to the artificial animated object engine 20. The artificial animated object engine 20 changes the internal state of the sobot according to the external input contained in the generated behavior change function and the genetic data of the sobot, thereby selecting the behavior corresponding to the changed internal state. Then, the artificial animated object engine 20 sends, in step 233, an action set function SetAction( ) to the application module 10 to set the action corresponding to the selected behavior. The application module 10 sends, in step 235, the received SetAction( ) to the sobot player 70, which in turn sends, in step 237, an action obtaining function GetAction( ) to the repository interface 100 in order to retrieve the action script corresponding to the new action defined by the SetAction( ) function. The repository interface 100 retrieves the corresponding action script defined by the GetAction( ) function from the database 90, delivered to the sobot player 70. The sobot player 70 sends, in step 239, an action set function SetAction( ) defining the action script for setting a new action of the sobot to the sobot graphic/audio interface 110, which in turn sends, in step 241, a parsing function Parse( ) to the script engine 80 to parse the action script defined by SetAction( ). The script engine 80 parses the received action script. Then, the sobot player 70 sends in step 243 a render function Render( ) to the sobot graphic/audio interface 110 to perform the new action. Receiving the Render( ) function, the sobot graphic/audio interface 110 sends, in step 245, a script run function RunScript( ) to the script engine 80, which in turn cooperates with the 3D engine 130 to run the parsed action script to enable the generated sobot to perform the new action.

Figure 4:
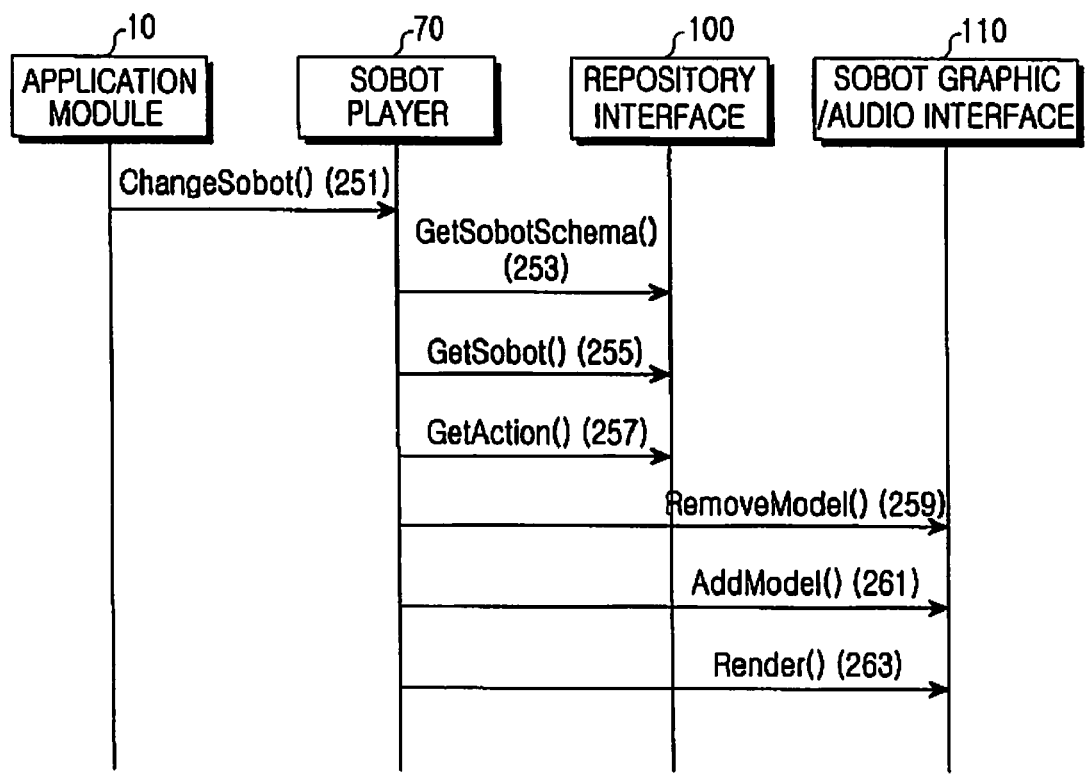
FIG. 4 is a flowchart for illustrating a process of generating another sobot in a sobot apparatus according to the present invention.

FIG. 4 is a flowchart illustrating a process of generating another sobot after removing the presently generated sobot. Receiving a request for replacing the generated sobot with a new one, the application module 10 sends, in step 251, a generated sobot change function ChangeSobot( ) containing the identifying information of the new sobot to the sobot player 70. The sobot player 70 sends, in step 253, a sobot schema obtaining function GetSobotSchema( ) to the repository interface 100 so as to obtain the basic sobot schema for generating the new sobot. Then, the sobot player 70 sends, in step 255, a sobot data obtaining function GetSobot( ) to the repository interface 100 to retrieve the sobot data of the new sobot from the memory device 140. The sobot player 70 sends, in step 257, an action obtaining function GetAction( ) to the repository interface 100 to retrieve the action script corresponding to the action information of the sobot data. The repository interface 100 retrieves the corresponding action script defined by the GetAction( ) from the database 90, delivered to the sobot player 70. The sobot player 70 sends, in step 259, a model remove function RemoveModel( ) to the sobot graphic/audio interface 110 so as to delete the presently generated sobot from the display part. Then, the sobot player 70 sends, in step 261, a model add function AddModel( ) to the sobot graphic/audio interface 110 so that the sobot graphic/audio interface 110 cooperates with the 3D engine so as to model the new sobot into a 3D image according to the basic model and resource information of the sobot data obtained in step 255 and the action script obtained in step 257.

Then, in step 263, the sobot player 70 sends a render function Render( ) to the sobot graphic/audio interface 110 to output the new sobot modeled in cooperation with the 3D engine 130 to the display device.

In addition, the action script stored in the player database 90 and the sobot data stored in the memory device 140 are managed by the user's input, as shown in FIGS. 5 to 9, which, in a sobot apparatus according to an embodiment of the present invention, respectively illustrate a process of managing a sobot, a process of managing the actions of a sobot, a process of managing the items of a sobot, a process of managing the scenes of a sobot, and a process of managing the resources of a sobot.

Figure 5:
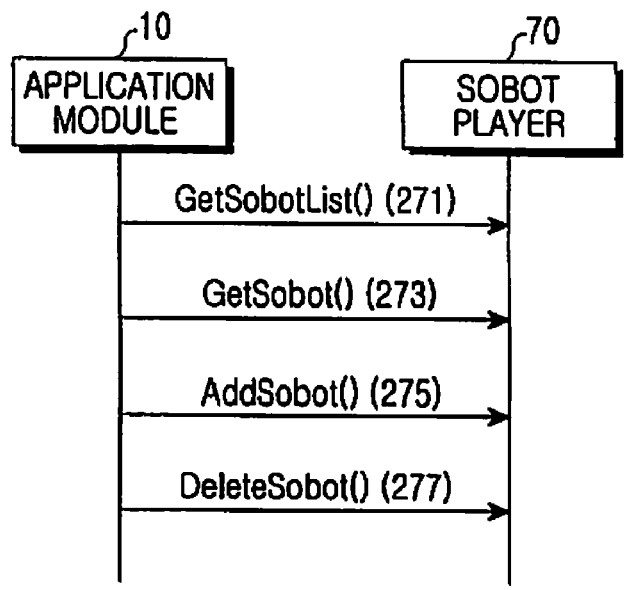
FIG. 5 is a flowchart for illustrating a process of managing a sobot in a sobot apparatus according to the present invention.

In FIG. 5, the application module 10 sends, in step 271, a sobot list retrieval function GetSobotList( ) to the sobot player 70. The sobot player 70 provides the user with a sobot list retrieved from the memory device 140. If the user selects a particular sobot from the sobot list, the application module 10 sends, in step 273, a sobot obtaining function GetSobot( ) to the sobot player 70 to retrieve the sobot data of the selected sobot provided for the user. If the user adds a new sobot, the application module 10 sends, in step 275, a sobot add function AddSobot( ) to the sobot player 70 so as to store the sobot data of the new sobot. If the user requests deletion of a sobot, the application module 10 sends a sobot delete function DeleteSobot( ) to the sobot player 70 to delete the corresponding sobot data.

Figure 6:
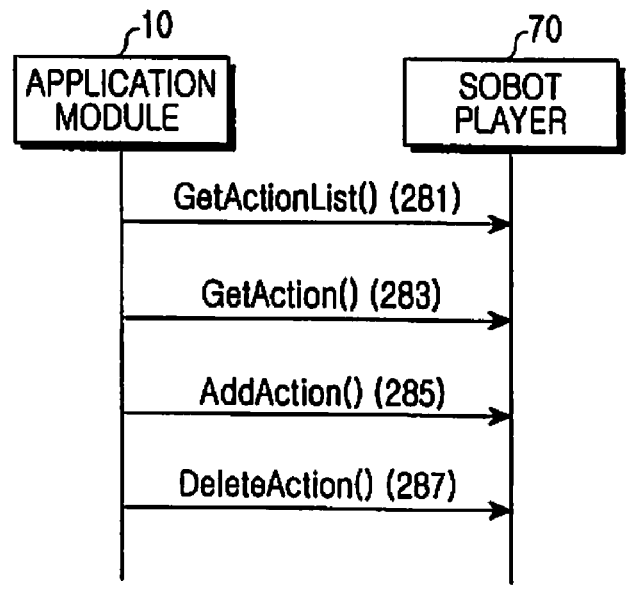
FIG. 6 is a flowchart for illustrating a process of managing the actions of a sobot in a sobot apparatus according to the present invention.

The user may also edit the action information contained in the sobot player data, as shown in FIG. 6. If the user requests the action list contained in the sobot data of a particular sobot, the application module 10 sends, in step 281, an action list obtaining function GetActionList( ) to the sobot player 70. The sobot player 70 provides the user with the action list prepared according to the action information contained in the sobot data. If the user selects a particular action from the action list, the application module 10 sends, in step 283, an action obtaining function GetAction( ) defining the action to the sobot player 70 to retrieve the detailed information of the selected action provided for the user. If the user adds a new action, the application module 10 sends, in step 285, an action add function AddAction( ) to the sobot player 70 so as to add the new action selected by the user to the sobot data. If the user requests deletion of an action, the application module 10 sends, in step 287, an action delete function DeleteAction( ) to the sobot player 70 to delete the action selected by the user.

Figure 7:
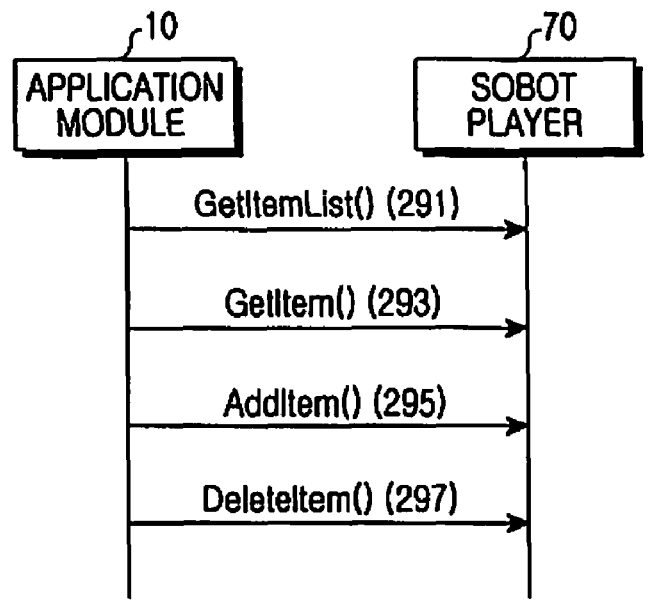
FIG. 7 is a flowchart for illustrating a process of managing the items of a sobot in a sobot apparatus according to the present invention.
Figure 8:
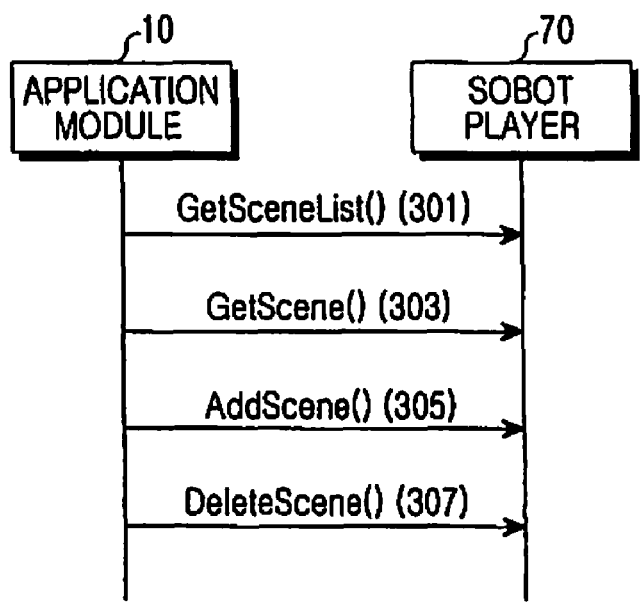
FIG. 8 is a flowchart for illustrating a process of managing the scenes of a sobot in a sobot apparatus according to the present invention.
Figure 9:
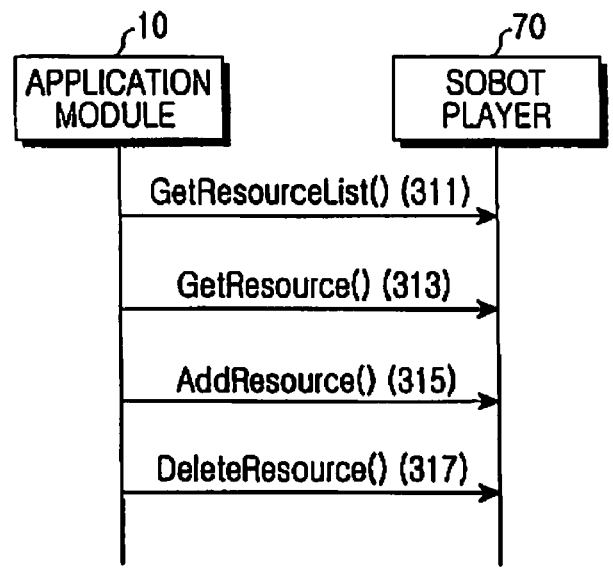
FIG. 9 is a flowchart for illustrating a process of managing the resources of a sobot in a sobot apparatus according to the present invention.

In addition, the user may also change the items of the resources set in the sobot, as shown in FIG. 7. The items may represent various accessories taken by the sobot. If the user requests the item list relating to a particular sobot, the application module 10 sends, in step 291, an item list obtaining function GetItemList( ) to the sobot player 70. The sobot player 70 provides the user with the item list prepared according to the resource information contained in the sobot data. If the user selects a particular item from the item list, the application module 10 sends, in step 293, an item obtaining function GetItem( ) to the sobot player 70 to retrieve the detailed information of the selected item provided for the user. However, if the user adds a new item relating to the particular sobot, the application module 10 sends, in step 295, an item add function AddItem( ) to the sobot player 70 so as to add the new item to the sobot data. If the user requests deletion of a particular item, the application module 10 sends, in step 297, an item delete function DeleteItem( ) to the sobot player 70 to delete the item Besides the items, the other resources set in the sobot may be managed as shown in FIGS. 8 and 9, similar to FIG. 7. Considering the background scenes with reference to FIG. 8, the application module 10 responds to the user's input in the steps of 301 to 307 so as to respectively send a scene list obtaining function GetSceneList( ), a scene obtaining function GetScene( ), a scene add function AddScene( ) and a scene delete function DeleteScene( ) to the sobot player 70 to provide the user with the list of the scenes set for a particular sobot and the detailed information of a particular scene, and to add a new scene and to delete a particular scene. Also, considering the resources with reference to FIG. 9, the application module 10 responds to the user's input in the steps of 311 to 317 so as to respectively send resource a list obtaining function GetResourceList( ), resource obtaining function GetResource( ), a resource add function AddResource( ) and a resource delete function DeleteResource( ) to the sobot player 70 to provide the user with the resource list set for a particular sobot and the detailed information of a particular resource, and to add a new resource and to delete a particular resource. In this case, the resources mean other things except the items and scenes. Although omitted from the above description, the processes as shown in FIGS. 5 to 9 are carried out in the manner the sobot player 70 cooperates with the repository interface 100. Namely, the functions input to the sobot player 70 are delivered to the repository interface 100 that interfaces the sobot player 70 with the memory device 140.

Figure 10:
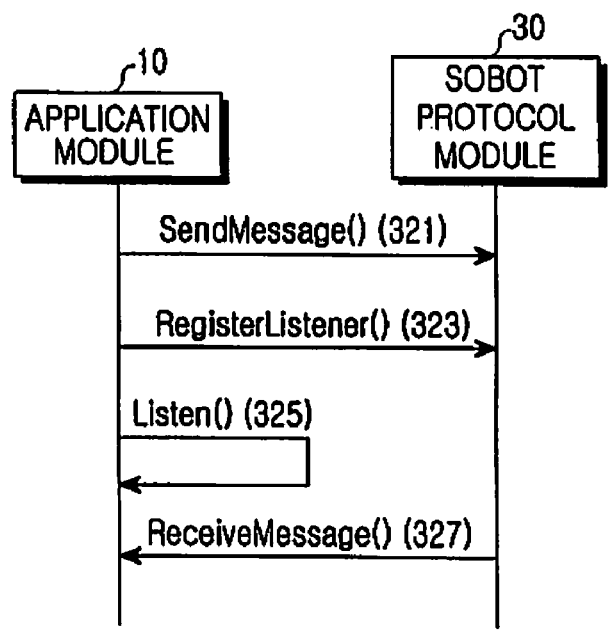
FIG. 10 is a flowchart for illustrating a process of transmitting and receiving messages in a sobot apparatus according to the present invention.
Figure 11:
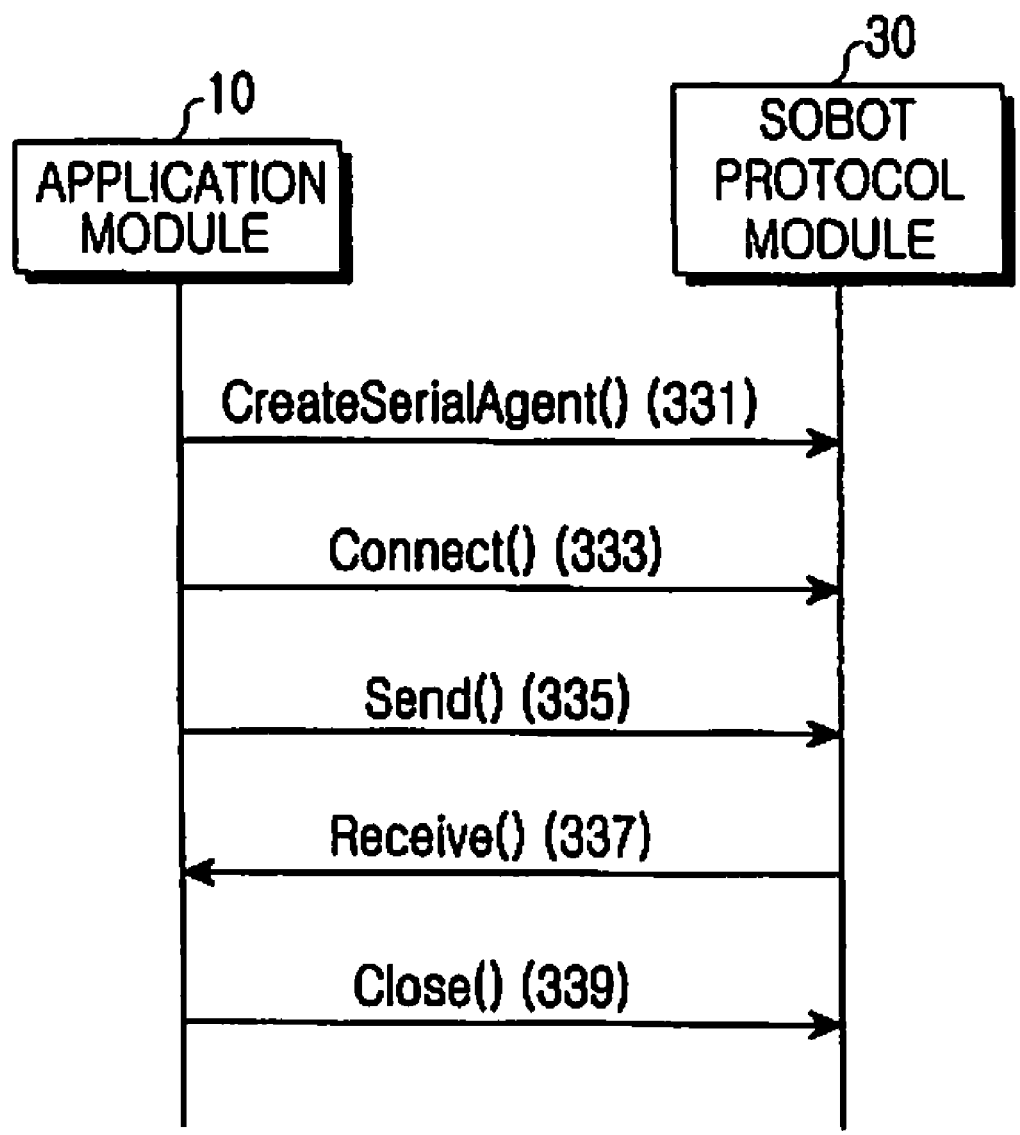
FIG. 11 is a flowchart for illustrating a process of performing a serial communication in a sobot apparatus according to the present invention.
Figure 12:
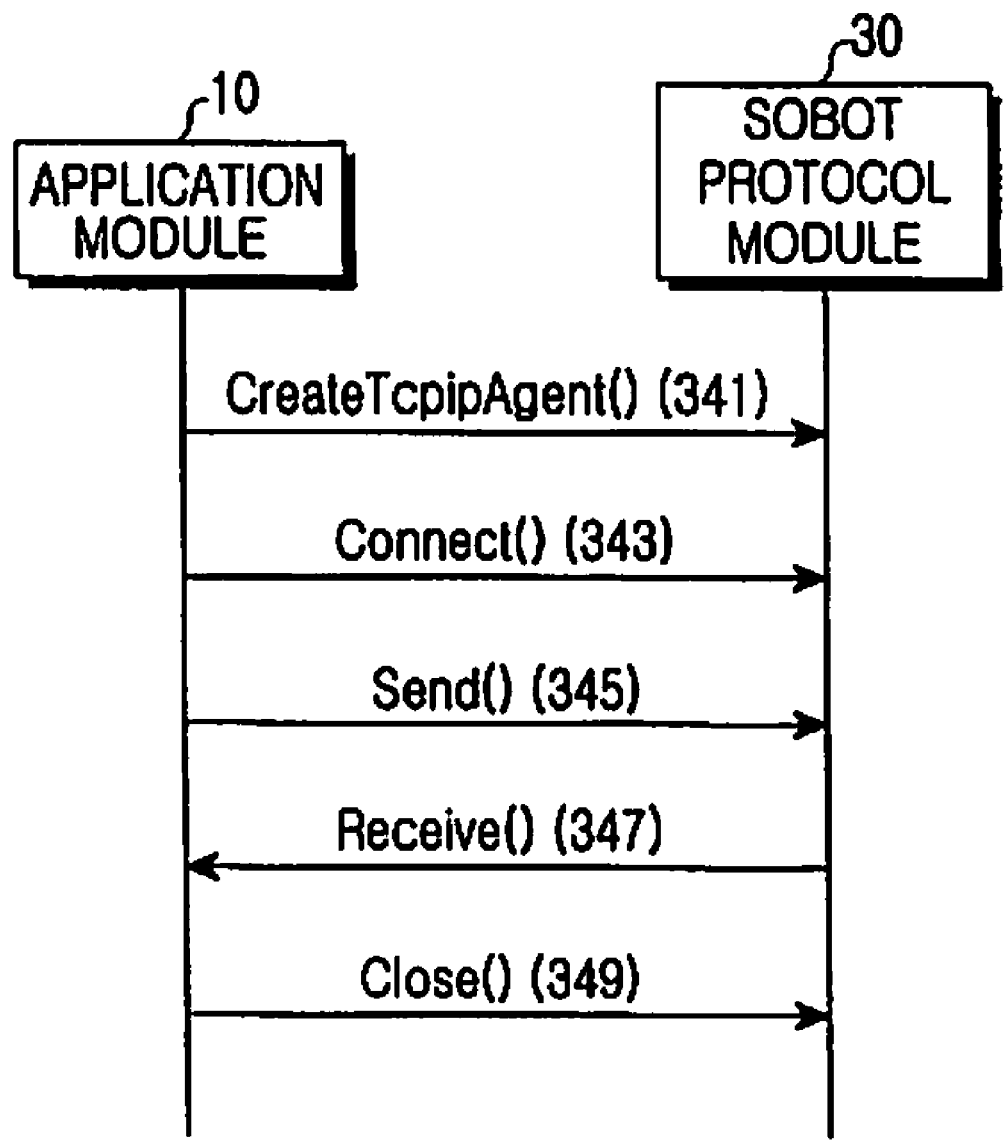
FIG. 12 is a flowchart for illustrating a process of performing a TCP/IP communication in a sobot apparatus according to the present invention.

The sobot may be transmitted through the sobot protocol module 30 to external terminals, as shown in FIGS. 10 to 12, which, in a sobot apparatus according to an embodiment of the present invention, respectively show a process of transmitting and receiving messages, a process of performing a serial communication, and a process of performing a TCP/IP communication. Description is made of transmission and reception of the messages, such as SMS and MMS, with reference to FIG. 10.

If the user requests preparation of SMS and MMS, the application module 10 sends a message agent function CreateMessageAgent( ) to the sobot protocol module 30 to create and initialize a message communication agent, such as an SMS/MMS message agent, according to the communication device applied. Then, the application module 10 prepares a message attached with a sobot according to the user's input. Thereafter, if the user requests transmission of the message, the application module 10 sends, in step 321, message send a function SendMessage( ) to the sobot protocol module 30, which in turn transmits the message through the network interface 60. Thereafter, the application module 10 registers the listener by means of a listener register function CreateListener( ) in step 323. Then, the application module 10 monitors through a listening function Listen( ) the reception of an answering message in response to the message transmitted through the sobot protocol module 30 in step 321. Then, in step 327, the sobot protocol module 30 transfers the received SMS or MMS message through a message receive function ReceiveMessage( ) to the application module 10.

Description is made of the process of transmitting the sobot in serial communication with reference to FIG. 11. If the user requests transmission of a particular sobot in serial communication, the application module 10 sends, in step 331, a serial communication agent function CreateSerialAgent( ) to the sobot protocol module 30 to obtain a serial communication agent through the network interface 120. In this case, the serial communication agent may be a serial phone agent or serial IPC agent according to the actual connection device.

Then, the application module 10 sends, in step 333, a connect function Connect( ) to the sobot protocol module 30 to request a connection for serial communication through the network interface 120. Thereafter, the application module 10 sends, in step 335, a function Send( ) to the sobot protocol module 30, which in turn transmits the particular sobot through the network interface 60 to an external device. If the sobot apparatus needs to receive a sobot from an external device connected in serial communication, the sobot protocol module 30 sends, in step 337, a receive function Receive( ) received from the network interface 60 to the application module 10 to prepare the sobot apparatus for the reception of the sobot. Upon completion of the serial communication, the application module 10 sends a close function Close( ) to the sobot protocol module 30.

The description below is made of the process of transmitting the sobot in TCP/IP communication with reference to FIG. 12. If the user requests a TCP/IP communication, the application module 10 sends, in step 341, a TCP/IP communication agent function CreateTcpipAgent( ) to the sobot protocol module 30 to initialize a TCP/IP communication agent. In this case, the TCP/IP communication agent may be a TCP/IP phone agent or a TCP/IP PDA agent. Then, the application module 10 sends, in step 343, a connect function Connect( ) to the sobot protocol module 30 to request a connection for TCP/IP communication through the network interface 120. Thereafter, the application module 10 sends, in step 345, a send function Send( ) to the sobot protocol module 30, which in turn transmits the particular sobot through the network interface 60 to an external device. If the sobot apparatus needs to receive a sobot from an external device through TCP/IP communication, the sobot protocol module 30 sends, in step 347, a receive function Receive( ) received from the network interface 60 to the application module 10 to prepare the sobot apparatus for the reception of the sobot. Upon completion of the TCP/IP communication, the application module 10 sends, in step 349, a close function Close( ) to the sobot protocol module 30 to end it.

While not shown in FIGS. 10 to 12, the functions received from the application module 10 are delivered to the network interface 60 to perform each communication. In addition to the functions mentioned above, various other functions relating to generating the sobot may be used for the operation of the sobot apparatus, such as a scene manager function GetSceneManager( ) for obtaining a scene manager, a camera move function MoveCamera( ) for changing the position of the camera so as to display the generated 3D sobot at a different point of view, a model move function MoveModel( ) for enabling the sobot to perform a designated action while changing the position, a background music set function SetBGM for controlling the background music, and a background music stop function StopBGM.

As described above, the present invention provides a sobot apparatus with a standardized platform covering all the components required for developing the sobot applications, so that varieties of instruments such as mobile phones, WIBRO phones, PDAs and PCs may be included with a sobot apparatus with a separate platform, and a convenient environment may be secured for the developers to develop the applications only by using the interface provided in the platform of a sobot apparatus.

While the invention has been shown and described with reference to a certain preferred embodiment thereof, it will be understood by those skilled in the art that various changes in form and details may be made therein without departing from the spirit and scope of the invention.

What is claimed is:

1. A software robot (sobot) apparatus with a genetic code, the sobot comprising:

an artificial animated object engine including a perception module, a learning module, an internal state module, a behavior selection module and a motor module for changing the internal state involving a motivation, a homeostasis, and an emotion state of the sobot in response to the input of an external stimulus exerted on the sobot according to the genetic code so as to determine the behavior of the sobot;

a sobot protocol module for providing a communication protocol for sobot-related data communication between the sobot and other external devices;

an update agent for controlling updates of the sobot-related data;

an update protocol module for providing an update protocol for transmitting/receiving the update data under the control of the update agent;

a network interface for interfacing the sobot with another device through a network in cooperation with the sobot protocol and the update protocol;

a player database for storing a plurality of action script files respectively describing a plurality of behaviors conducted by the sobot;

a script engine both for encoding a plurality of action files respectively describing the plurality of behaviors to generate the respective action script files stored in the player database and for parsing the script files retrieved from the player database;

a memory device for storing sobot data including a genetic code, a basic model information, an internal state information, an action information, and a resource information of at least one sobot;

a repository interface for interfacing the memory device with the player database;

an output application module for visual output of the sobot by means of images and sounds;

a sobot graphic/audio interface for interfacing the output application module with a display device;

an application module for transferring an external input relating to the output and control of the sobot to a sobot player, an external input affecting the internal state of the sobot both to the artificial animated object engine and to the sobot player, an external input relating to the communication of the sobot to the sobot protocol module, and a behavior determined by the artificial animated object engine to the sobot player; and the sobot player for output of the sobot in cooperation with the script engine and the output application module through the repository interface and the sobot graphic/audio interface according to an input of the application module.

2. The sobot apparatus of claim 1, wherein the perception module preprocesses the input of external stimuli used for the internal state change, behavior selection, and learning so as to select those having higher priorities from a plurality of the presently input external stimuli according to a priority order, the selected stimuli being delivered to the internal state module, behavior selection module, and learning module;

the internal state module changes the internal state according to the external stimuli and corresponding genetic code to notify the behavior selection module of the changed internal state;

the behavior selection module selects one of the behaviors previously stored according to the external stimuli and the internal state;

the learning module comprehends the objectives intended by the external stimuli so as to generate an avoidance action or approach action according as the external stimuli representing praise or reproach; and the motor module provides an algorithm to move the sobot according to the behavior selected by the behavior selection module.

3. The sobot apparatus of claim 2, wherein the perception module includes a plurality of sensors, a symbolizer, and an attention selector;

the behavior selection module generates a new behavior for the final action if a specific event occurs; and the learning module makes the sobot perform the activity corresponding to a user's voice command.

4. The sobot apparatus of claim 1, wherein the basic model information represents the character kind and model of the sobot, the internal state information represents the internal state of the sobot including the motivation, homeostasis, and emotion states most recently changed by the artificial animated object engine according to the external input applied to the produced sobot and the genetic code, and the action information represents the action determined by the artificial animated object engine so as to be performed according to the internal state information.

5. The sobot apparatus of claim 1, wherein the update agent controls the sobot apparatus to receive recently updated data by confirming a recently updated version of the sobot when connecting to a sobot server.

6. The sobot apparatus of claim 1, wherein the update protocol module provides OMADM (Object Management Architecture Device Management) protocol.

7. The sobot apparatus of claim 1, wherein the network interface provides an interface required for a SMS (Short Message Service), a MMS (Multimedia Message Service), a serial communication, and a TCP/IP (Transmission Control Protocol/Internet Protocol) communication.

8. The sobot apparatus of claim 1, wherein the output application module is a 3D engine.

9. The sobot apparatus of claim 1, wherein the player database stores data supporting the output application module.

10. The sobot apparatus of claim 1, wherein if the application module requests that the sobot player generate a sobot, a different behavior of a previously generated sobot, or a different sobot, the sobot player retrieves the sobot data of the corresponding software from the memory device and the necessary action script from the player database through the repository interface so as to generate the corresponding sobot by cooperating with said script engine and output application module through the sobot graphic/audio interface.

11. The sobot apparatus of claim 1, wherein if the user inputs a sobot generation command through the application module, the sobot player, the repository interface, the memory device, the sobot graphic/audio interface, the script engine, the player database and the output application module exchange with one another a generated sobot designation function InitPlayer( ), a creative device function CreateDevice( ), a sobot generation function ShowSobot( ), a sobot schema obtaining function GetSobotSchema( ), a sobot data obtaining function GetSobot( ), an action obtaining function GetAction( ), a scene forming function MakeScene( ), an action set function SetAction( ), a parsing function Parse( ), a render function Render( ) and a script run function RunScript( ), so that the sobot player retrieves the sobot data of a desired sobot from the memory device through the repository interface to detect the action information from the sobot data, and then obtains the action script corresponding to the action information from the player database through the repository interface, delivered through the sobot graphic/audio interface to the script engine to produce parsed action script, the sobot player also detecting the basic model information and resource information from the sobot data, whereby the sobot graphic/audio interface cooperates with the output application module so as to visually generate the desired sobot according to the basic model information and resource information and the parsed action script.

12. The sobot apparatus of claim 1, wherein if a generated sobot receives the input of an external stimulus, the artificial animated object engine, the sobot player, the repository interface, the memory device, the sobot graphic/audio interface, the script engine, the player database and the output application module exchange with one another a generated behavior change function, an action set function SetAction( ), an action obtaining function GetAction( ), a parsing function Parse( ), a render function Render( ) and a script run function RunScript( ), so that the application module applies the external input to the artificial animated object engine and an action from the artificial animated object engine to the sobot player;

the artificial animated object engine changes the internal state of the sobot according to the external input and the genetic code of the sobot retrieved from the memory device, and selects the behavior corresponding to the changed internal state so as to deliver the action designated corresponding to the selected behavior to the application module; and the sobot player obtains the action script corresponding to the action through the repository interface to deliver the action script through the sobot graphic/audio interface to the script engine to parse the action script; and the sobot graphic/audio interface cooperates with the output application module so as to make the sobot operate according to the parsed action script.

13. The sobot apparatus of claim 1, wherein if another sobot is requested to be output in the presence of a previously generated sobot, the sobot player, the repository interface, the memory device, the sobot graphic/audio interface, the script engine, the player database and the output application module exchange with one another a generated sobot change function ChangeSobot( ), a sobot schema obtaining function GetSobotSchema( ), a sobot data obtaining function GetSobot( ), an action obtaining function GetAction( ), a model removal function RemoveModel( ), a model add function AddModel( ) and a render function Render( ), so that the sobot player stops to output the previously generated sobot through the sobot graphic/audio interface, obtains the sobot data of the another sobot from the memory device through the repository interface, detects the action information from the sobot data, and retrieves the action script corresponding to the action from the player database through the repository interface so as to deliver the action script together with the basic model information and resource information to the sobot graphic/audio interface; and the sobot graphic/audio interface cooperates with the output application module so as to visually output the another sobot according to the basic model information, the resource information and the action script.

14. The sobot apparatus of claim 1, wherein sobot player provides a sobot list stored in memory device and the detailed information of a designated sobot, adds the sobot data of a new sobot, and deletes the sobot data of a designated sobot upon the user's request through a sobot list retrieval function GetSobotList( ), a sobot data obtaining function GetSobot( ), a sobot add function AddSobot( ) and a sobot delete function DeleteSobot( ).

15. The sobot apparatus of claim 1, wherein the sobot player provides an action list according to the action information included in the sobot data and the detailed information of a designated action in the action list, adds a new action, and deletes a designated action upon the user's request through an action list obtaining function GetActionList( ), an action obtaining function GetAction( ), an action add function AddAction( ) and an action delete function DeleteAction( ).

16. The sobot apparatus of claim 1, wherein the sobot player provides an item list according to the resource information included in the sobot data and the detailed information of a designated item in the item list, adds a new item, and deletes a designated item upon the user's request through an item list obtaining function GetItemList( ), an item obtaining function GetItem( ), an item add function AddItem( ) and an item delete function DeleteItem( ).

17. The sobot apparatus of claim 1, wherein the sobot player provides a scene list according to the resource information included in the sobot data and the detailed information of a designated scene in the scene list, adds a new scene, and deletes a designated scene upon the user's request through a scene list obtaining function GetSceneList( ), a scene obtaining function GetScene( ), a scene add function AddScene( ) and a scene delete function DeleteScene( ).

18. The sobot apparatus of claim 1, wherein the sobot player provides a resource list according to the resource information included in the sobot data and the detailed information of a designated resource in the scene list, adds a new resource, and deletes a designated resource upon the user's request through a resource list obtaining function GetResourceList( ), a resource obtaining function GetResource( ), a resource add function AddResource( ) and a resource delete function DeleteResource( ).

19. The sobot apparatus of claim 1, wherein the sobot player performs SMS and MMS upon the user's request through a message agent function CreateMessageAgent( ), a message send function SendMessage( ), a listener register function CreateListener( ), a listening function Listen( ) and a message receive function ReceiveMessage( ).

20. The sobot apparatus of claim 1, wherein the sobot player performs serial communication upon the user's request through a serial communication agent function CreateSerialAgent( ), a connect function Connect ( ), a send function Send( ), a receive function Receive( ) and a close function Close( ).

21. The sobot apparatus of claim 1, wherein the sobot player performs TCP/IP communication upon the user's request through a TCP/IP communication agent function CreateTcpipAgent( ), a connect function Connect( ), a send function Send( ), a receive function Receive( ) and a close function Close( ).

* * * * *